(12) United States Patent
Edmiston (10) Patent No.: US 9,258,246 B2
(45) Date of Patent: Feb. 9, 2016

(54) INTEGRATED CIRCUIT DEVICE AND METHODS FOR PERFORMING CUT-THROUGH FORWARDING

(75) Inventor: Graham Edmiston, Bridge of Weir (GB)

(73) Assignee: FREESCALE SEMICONDUCTOR, INC, Austin, TX (US)

( * ) Notice: Subject to any disclaimer, the term of this patent is extended or adjusted under 35 U.S.C. 154(b) by 152 days.

(21) Appl. No.: 14/007,861

(22) PCT Filed: Apr. 20, 2011

(86) PCT No.: PCT/IB2011/051716
§ 371 (c)(1),
(2), (4) Date: Sep. 26, 2013

(87) PCT Pub. No.: WO2012/143757
PCT Pub. Date: Oct. 26, 2012

(65) Prior Publication Data
US 2014/0029625 A1    Jan. 30, 2014

(51) Int. Cl.
*H04L 12/947* (2013.01)
*H04L 12/863* (2013.01)
(Continued)

(52) U.S. Cl.
CPC .......... *H04L 47/623* (2013.01); *H04L 49/1546* (2013.01); *H04L 49/251* (2013.01); *H04L 49/257* (2013.01); *H04L 45/40* (2013.01)

(58) Field of Classification Search
CPC ... G06F 9/4881; H04L 49/257; H04L 49/251; H04L 49/103; H04L 47/623; H04L 45/40; H04L 2012/5681; H04L 2012/5679; H04L 49/256; H04L 49/188; H04L 49/1546

USPC ......... 370/401, 389, 390, 413, 395.7, 395.72, 370/360, 420, 396, 392, 412; 718/103, 108, 718/1; 340/2.21; 710/317, 38; 709/223, 709/225, 227
See application file for complete search history.

(56) References Cited

U.S. PATENT DOCUMENTS 6,556,571 B1     4/2003   Shahrier et al.
6,671,275 B1 *  12/2003   Wong .................. H04L 12/5693
                                                    370/389

(Continued)

FOREIGN PATENT DOCUMENTS

CN           101304374 A      11/2008
WO           WO99-27688 A1     6/1999
WO           WO2009/098542 A1  8/2009

OTHER PUBLICATIONS

Burns, Alan. Preemptive priority based scheduling: An appropriate engineering approach. University of York, Department of Computer Science, 1993, 24 Pages.*

(Continued)

*Primary Examiner* — Edan Orgad
*Assistant Examiner* — Ivan O Latorre (57) ABSTRACT

An integrated circuit device comprising at least one cut-through forwarding module. The cut-through forwarding module comprises at least one receiver component arranged to receive data to be forwarded, and to generate a request for transmission of a block of data upon receipt thereof, and at least one controller unit arranged to execute at least one thread for processing requests generated by the at least one receiver component. The at least one controller unit is arranged to set a priority context for the at least one thread, and to schedule an execution of the at least one thread based at least partly on the priority context therefor.

20 Claims, 7 Drawing Sheets

(51) Int. Cl.
*H04L 12/933* (2013.01)
*H04L 12/721* (2013.01)

(56) References Cited

U.S. PATENT DOCUMENTS

| | | | |
|---|---|---|---|
| 6,928,470 B1 | 8/2005 | Hamlin | |
| 7,103,683 B2* | 9/2006 | Madukkarumukumana et al. | 710/52 |
| 7,391,787 B1* | 6/2008 | McCrosky | H04L 12/5693 370/413 |
| 7,653,086 B2 | 1/2010 | Beser | |
| 7,769,015 B2 | 8/2010 | Huang et al. | |
| 2002/0118692 A1* | 8/2002 | Oberman et al. | 370/419 |
| 2003/0208521 A1* | 11/2003 | Brenner et al. | 709/103 |
| 2005/0117575 A1 | 6/2005 | Konda | |
| 2005/0240745 A1* | 10/2005 | Iyer et al. | G06F 12/0223 711/167 |
| 2005/0270173 A1* | 12/2005 | Boaz | H04Q 9/00 340/870.02 |
| 2006/0114907 A1* | 6/2006 | Wu | 370/392 |
| 2008/0019395 A1* | 1/2008 | Aithal | H04L 1/0002 370/468 |
| 2008/0184233 A1* | 7/2008 | Norton et al. | 718/100 |
| 2008/0186983 A1* | 8/2008 | Dielissen et al. | H04L 47/10 370/400 |
| 2010/0205245 A1* | 8/2010 | Le Scouarnec et al. | 709/203 |
| 2010/0332698 A1* | 12/2010 | Muller | H04L 49/90 710/57 |
| 2011/0153822 A1* | 6/2011 | Rajan et al. | 709/225 |
| 2012/0066683 A1* | 3/2012 | Srinath | 718/102 |

OTHER PUBLICATIONS

International Search Report and Written Opinion correlating to PCT/IB2011/051716 dated Jan. 19, 2012.

* cited by examiner

INTEGRATED CIRCUIT DEVICE AND METHODS FOR PERFORMING CUT-THROUGH FORWARDING

FIELD OF THE INVENTION

The field of this invention relates to an integrated circuit device and methods for performing cut-through forwarding of packet data.

BACKGROUND OF THE INVENTION

In the field of computer networking, cut-through forwarding, also known as cut-through switching, is a switching method for packet switching systems in which a network switch starts forwarding a frame (or packet) before the whole frame has been received by the network switch. Such a forwarding operation is performed typically as soon as the destination address has been processed. In this manner, cut-through forwarding enables the latency through the switch to be significantly reduced. The use of cut-through forwarding is an important feature of packet orientated deterministic automation systems. Furthermore, the implementation of such systems is expanding in the industrial market, and the technique is increasingly finding its way into solutions for the home, medical and automotive applications.

Cut-through forwarding systems typically require tight control over the latency of a switch (i.e. the delay between data being received by the switch and that data subsequently being transmitted (forwarded on) by the switch) and jitter (i.e. the variance in time periods between the transmission of consecutive frames) in order to ensure deterministic behaviour and scalability. Typically, such latency/jitter requirements differ between different cut-through 'modes' (e.g. between different packet switching protocols). For example, such cut-through modes might include, by way of example, Ethernet protocols such as EtherCAT (Ethernet for Control Automation Technology), ProfiNET, Ethernet/IP, DLR (Device Level Ring) or a cut through switch for IP traffic. Control over latency and jitter is of particular importance for cut-through forwarding modes that involve Ethernet frames and the like, in which frames are unpredictably spaced and may be seconds apart or back to back, unlike, say, Voice over IP (VoIP) which has predictable frame spacing. In order for a cut-through switch to be competitive in the market place, it must be capable of supporting such deterministic behaviour and scalability across multiple cut-through switching modes.

Conventionally tight control of latency and jitter is provided by way of dedicated hardware blocks that are arranged to meet specific latency and jitter requirements. The use of such dedicated hardware blocks on a single device leads to a relatively expensive and inflexible solution. In particular, in order for a given switch to be able to meet the requirements of more than one cut-through mode, a separate, dedicated hardware block is required for each cut-through mode, thereby resulting in a significant increase in cost, power consumption and real estate requirements for the switch.

SUMMARY OF THE INVENTION

The present invention provides an integrated circuit device and a method for performing cut-through deterministic forwarding of packet data as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Examples of the present invention will now be described with reference to an example of a cut-through forwarding module, such as may be implemented within a packet switching system. However, the present invention is not limited to the specific instruction cut-through forwarding architecture herein described with reference to the accompanying drawings, and may equally be applied to alternative architectures. For example, for the illustrated examples, the cut-through forwarding module is illustrated as comprising a single, unitary controller unit for controlling the cut-through forwarding operations. However, the functionality of the controller herein described may equally be provided across a plurality of such controllers, and/or the functionality of such a controller may equally be distributed across a plurality of functional modules. Additionally, because the illustrated example embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
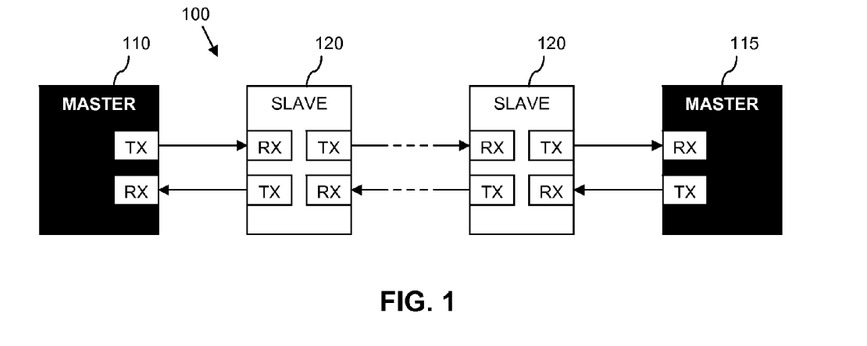
FIG. 1 shows a simplified block diagram of an example of a packet switching system.

Referring now to FIG. 1, there is illustrated a simplified block diagram of an example of a packet switching system 100 in which cut-through forwarding may be implemented. As illustrated in FIG. 1, packet data is typically transmitted between system master devices 110, 115. The data to be transmitted is arranged into data packets, or 'frames' by the source master device 110, and then transmitted via the packet switching system 100 to the destination master device 115, in the top data flow example. The data frames are routed/forwarded through the packet switching system 100 via slave switching modules 120. In order to reduce latency within the packet switching system 100 (i.e. the time between data being transmitted by a source master device 110 and that data being received by a destination master device 115), it is known to implement cut-through forwarding within the slave devices 120.

Cut-through forwarding, also known as cut-through switching, is a switching method for packet switching systems in which a network switch (such as a slave device 120 in FIG. 1) starts forwarding a data frame (or packet) before the whole frame has been received; typically, but not uniquely, soon after the destination address has been processed. In this manner, cut-through forwarding enables the latency through each switch to be significantly reduced. The latency of a cut-through forwarding switch, i.e. a slave device 120 in FIG. 1, is defined as the time between the slave device 120 receiving data and the same slave device 120 subsequently transmitting (i.e. forwarding on) that data. Thus, by not waiting until an entire frame has been received before beginning to transmit the data frame, the propagation latency of the switch may be reduced. As transmission of a data frame is commenced before the entire data frame has been received, the data frame may be spread across a plurality of master/slave devices 110, 115, 120 within a packet switching system 100 during transmission. By way of example, consider a frame that is 1000 bytes long, and a switching system 100 comprising slave devices 120 that commence (re)transmission/forwarding of a data frame after receiving, say, 16 bytes of that frame. That frame may (theoretically) be in transit across over 60 slave devices 120. Thus, cut-through forwarding enables the latency across the system 100 to be considerably reduced in comparison to systems in which the entire frame is received by each slave device prior to the entire frame being forwarded.

Figure 2:
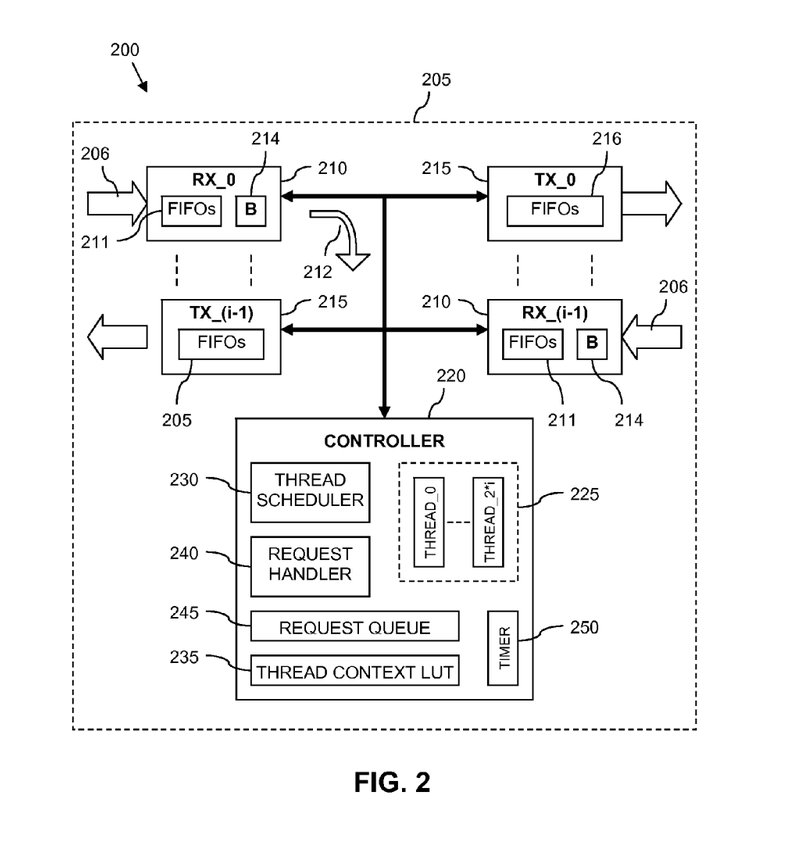
FIG. 2 shows a simplified block diagram of an example of a cut-through forwarding module.

Referring now to FIG. 2, there is illustrated a simplified block diagram of an example of a cut-through forwarding module 200, such as may be implemented within a slave device 120 of the packet switching system 100 of FIG. 1. The cut-through forwarding module 200 for the illustrated example is implemented within an integrated circuit device, illustrated generally at 205, and comprises one or more receiver components 210 and one or more transmitter components 215. Each receiver component 210 comprises a FIFO (first in first out) buffer 211 in which received data is stored. When a block of B bytes of data has been received by a receiver component 210, the receiver component 210 is arranged to generate a request, for example as illustrated generally at 212, for that block of data to be transmitted. The request 212 is provided to a controller unit 220 which is arranged to process the request, cause the block of data to be transferred to a FIFO 216 of the appropriate transmitter component 215, and to trigger the transmission of the data block by the transmitter component 215.

Thus, the time between the cut-through forwarding module 200 receiving data and subsequently forwarding that data (i.e. the latency thereof) is dependent on the block size (B bytes) and the data rate of the input channel 206 over which the data is received (i.e. the rate at which the cut-through forwarding module 200 receives the data). Accordingly, if the data rate of the input channel 206 is known, then a required maximum latency may be achieved by configuring the block size B such that:

$$B < data\_rate\_in * latency \quad [Eq. 1]$$

where data_rate_in represents the data rate of the input channel 206, and latency represents the required maximum latency period to be achieved.

In accordance with some examples the block size B may be configurable. For example, each receiver component 210 may comprise a programmable register, such as illustrated at 214, within which a value may be configurably set to define the block size B. In this manner, the latency of the cut-through forwarding module 200 may be configured according to the specific requirements of the cut-through forwarding mode for which it is supporting. In particular, if the data rate of the input channel(s) 206 is known, the block size B may be configured in order to meet a specific latency requirement. It is envisaged that, for some examples, the block size B may be configurable by the controller unit 220, for example in response to one or more software configurations therein, or in response to one or more data inputs thereof (not shown) relating to, say, a cut-through forwarding mode to be supported.

As will be appreciated, if the block size B is configured too small, the time between requests being generated by the receiver components 210 may be too short for the requests to be consecutively processed by the controller unit 220, thereby resulting in an under-run of the blocks of data being provided to the transmitter components 215, and thereby potentially causing the respective data frame to be aborted. Accordingly, in some examples, a minimum block size B supported by the cut-through forwarding module 200 should be adhered to whereby sufficient time between requests generated by the receiver components 210 is provided in order to enable the requests to be processed by the controller unit 220. Such a minimum block size may typically depend on the number of transmitter/receiver components that is/are required to be serviced by the (or each) controller hardware processor (not shown), and the amount of processing required for each service provided.

For example, the controller unit 220 may comprise one or more hardware processors, such as RISC (reduced instruction set computer) processors, each arranged to execute one or more threads; each thread arranged to service, say, one transmitter/receiver component of the cut-through forwarding module (e.g. process requests, etc., in the case of a receiver component 210). The amount of time required to process a request from a receiver component 210 is dependent upon the amount of processing required (e.g. the number and complexity of the operations that are required to be performed) and the processing speed/frequency of the respective processor hardware that is performing the processing. The processing speed/frequency of the respective processor hardware is dependent upon the cut-through forwarding module implementation, and is typically a fixed quantity. The amount of processing required will typically depend upon the cut-through forwarding mode being supported, etc. Accordingly, the minimum amount of time required between requests generated by a receiver component 210 in order to enable the requests to be processed by the controller unit 220, and thereby the minimum block size B that may be supported by the cut-through forwarding module 200, is dependent on both the specific cut-through forwarding module hardware implementation, as well as the particular cut-through forwarding mode being supported thereby.

Since both the processing capabilities of the controller hardware processor(s) and the processing requirements for requests generated by the receiver components 210 for particular cut-through forwarding modes are typically known or predictable prior to implementation, a minimum block size B may be predetermined and configured for substantially any hardware implementation and cut-through forwarding mode combination. In this manner, the latency of the cut-through forwarding module 200 may be accurately controlled, thereby enabling the latency of the cut-through forwarding module 200 to be minimized, whilst ensuring under-run is avoided within the cut-through forwarding module.

Cut-through forwarding modes not only require tight control of latency, but also of jitter, i.e. the variance in time periods between the transmission of consecutive frames. In particular, it is generally desirable to minimise the jitter within the transmission of a stream of data frames. However, minimizing jitter through a cut-through forwarding module typically compromises the minimum latency that is achievable through that module. Such jitter requirements also differ between different cut-through forwarding modes. Accordingly, in order for a cut-through module, such as the cut-through module 200 of FIG. 2, to be able to support multiple cut-through modes, it is necessary for the cut-through module to be able to control both the latency and jitter of data there through in accordance with the various different requirements of the cut-through modes supported thereby.

As previously mentioned, the controller unit 220 of the cut-through forwarding module 200 of FIG. 2 is arranged to execute threads for processing requests generated by the receiver components. In addition, the controller unit 220 is arranged to set a priority context for each thread, and to schedule the execution of threads based at least partly on the priority contexts therefor.

Figure 3:
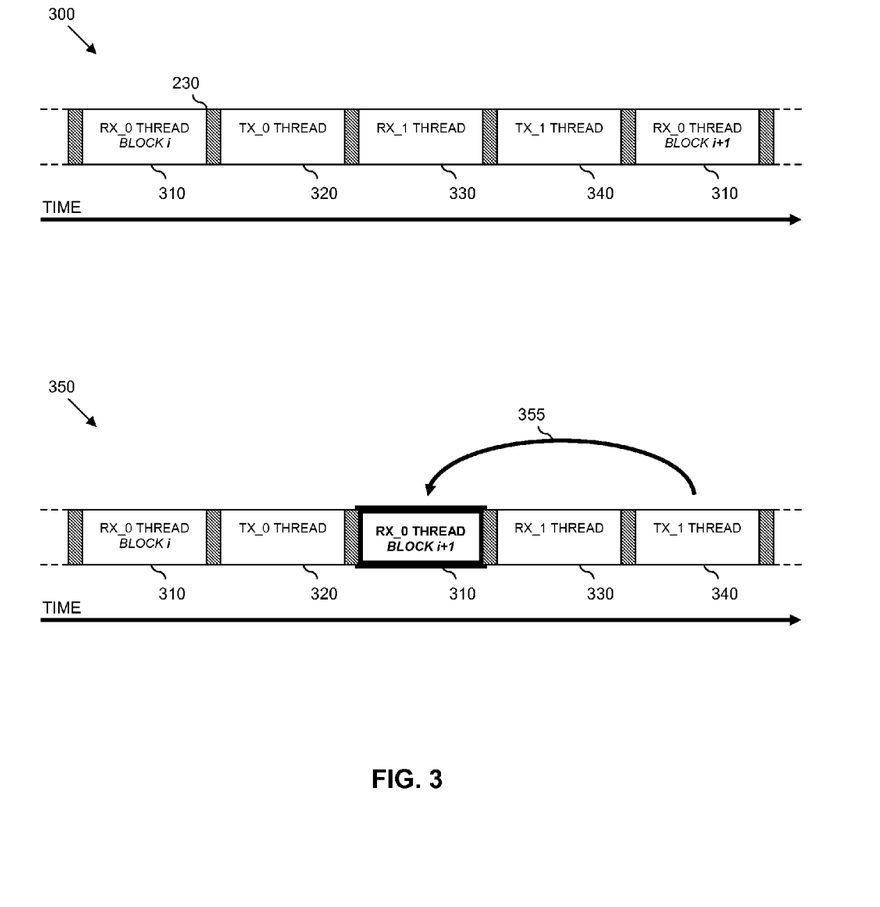
FIG. 3 shows simplified examples of the scheduling of threads within a cut-through forwarding module, say, the cut-through forwarding module of FIG. 2.

For example, and referring to FIG. 3, there is illustrated a first simplified example 300 of the execution of multiple (four in this case) threads 310, 320, 330, 340, for example such as may be implemented within a hardware processor (not shown) of the controller unit 220 of FIG. 2. In the illustrated example, each thread 310, 320, 330, 340 is arranged to service one of the receiver or transmitter components 210, 215. In this first example, all threads are assigned the same priority context (e.g. 'normal'), and are thus scheduled to be executed in order of the receipt of requests, etc., from their respective receiver or transmitter components 210, 215. Thus, for the illustrated time period of the first example illustrated in FIG. 3, the threads are executed in the order of Rx_0 310 (servicing, say, a first receiver component 210), Tx_0 320 (servicing, say, a first transmitter component 215), Rx_1 330 (servicing, say, a second receiver component 210), and Tx_1 340 (servicing, say, a second transmitter component 215). The scheduling of the tasks is, thus, typically cycled in this manner. For example, thread Rx_0 310 is scheduled again after thread Tx_1 340, and with the order in which threads are scheduled is determined based on the order in which requests, etc., are received from their respective components. As illustrated in FIG. 3, the execution of consecutive threads 310, 320, 330, 340 may be separated by a brief execution of a supervisor process, such as the thread scheduler 230 illustrated in FIG. 2, which is responsible for the scheduling of threads to be executed.

FIG. 3 also illustrates a second simplified example 350 of the execution of the four threads 310, 320, 330, 340. Initially in this second simplified example 350, all four threads are assigned the same priority context (e.g. 'normal'), and are, thus, initially scheduled to be executed in order of the receipt of request etc. from their respective receiver or transmitter components 210, 215. Thus, once again thread Rx_0 310 may be scheduled first, followed by thread Tx_0 320. However, for this second example 350, the priority context of thread Rx_0 310 is set to a higher priority, e.g. set 'prioritised' after (or during) this first illustrated execution therefor. In this manner, a request received from the respective receiver component 210 of thread Rx_0 310 is to be given priority over requests etc. that relate to 'normal' priority threads. In the illustrated example, no such request from the receiver component 210 of thread Rx_0 310 is initially pending. As such, thread Tx_0 320 is scheduled and executed in accordance with the normal order of threads. However, upon thread Tx_0 320 returning to the thread scheduler 230, a request from the receiver component 210 of thread Rx_0 310 is pending. Accordingly, because thread Rx_0 310 has a higher priority than the other threads, it is scheduled ahead of the other threads in order to accelerate the processing of the pending request therefor, as illustrated generally at 355.

Thus, in this manner, by scheduling the execution of threads based at least partly on the priority contexts therefor, the processing of requests for a particular thread may be prioritised, thereby enabling the processing therefor to be accelerated. By enabling the processing of requests from a receiver component 210 to be accelerated, the processing and transmission of data blocks relating thereto may be accelerated. In this manner, an additional level of control over latency and, in particular, jitter may be provided for the cut-through forwarding of packet data. In particular, by setting to a higher priority a priority context for a thread for which a request relating to a 'jitter sensitive' block (e.g. a first block of a frame of data) is awaiting processing. Thus, the processing of such a request may be accelerated, thereby enabling the jitter of the related data stream to be better controlled.

Figure 4:
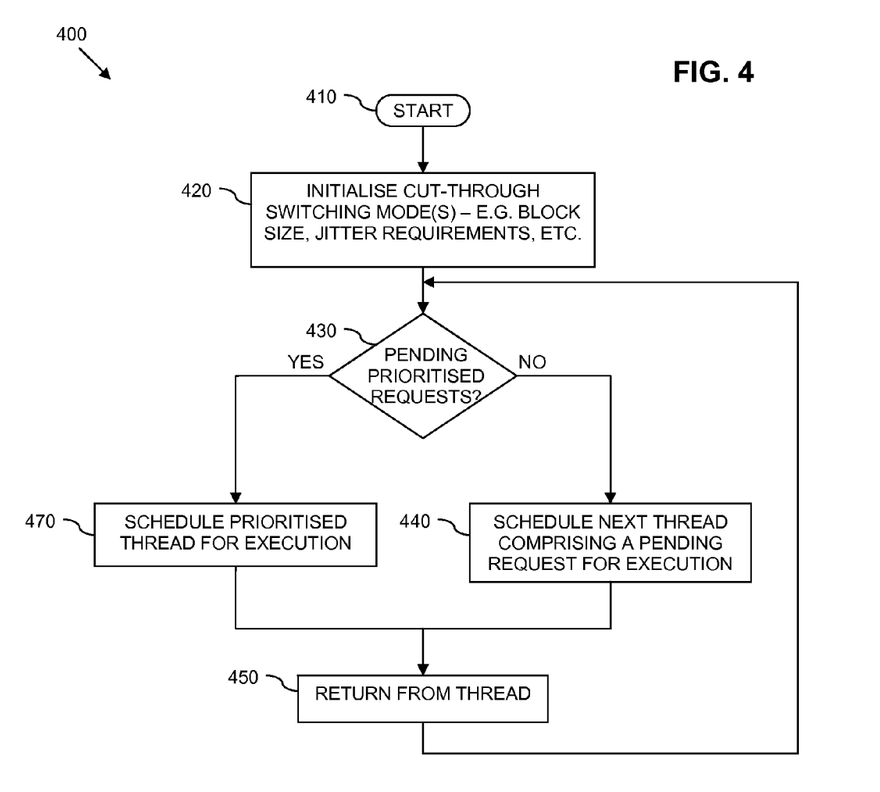
FIGS. 4 to 8 illustrates simplified flowcharts of parts of an example of a method for performing cut-through forwarding of packet data.

FIG. 4 illustrates a simplified flowchart 400 of an example of a method for performing cut-through forwarding of packet data, such as may be implemented within the controller unit 220 of FIG. 2. The method starts at 410, and moves on to 420 where the cut-through forwarding module 200 of FIG. 2 is initialised, for example in accordance with a required cut-through forwarding mode that is to be supported. Such initialisation may comprise configuring the block size B within the receiver components 210 and/or any other parameters for controlling latency and/or jitter, such as described in greater detail below. In addition, initial priority contexts may be set (e.g. to 'normal' priority) for the threads 225 arranged to support the receiver and/or transmitter components 210, 215 of the cut-through forwarding module 200. For example, the controller unit 220 may comprise a thread context look up table (LUT) stored within an area of memory, such as illustrated at 235, and in which the priority contexts may be stored and updated. The method then moves on to 430 where it is determined whether (or not) any requests are pending for threads 225 having a priority context set to a higher priority (e.g. to 'prioritised'). Since in this example all priority contexts have been initialised to a 'normal' priority, none of the threads 225 have a priority context set to 'higher' priority, and the method moves on to 440 where a thread 225 of the next (or in this case first) pending request from a receiver/transmitter component 210, 215 is scheduled for execution. For example, the thread scheduler may be arranged to schedule threads for execution in a generally 'round robin' order. For example, if threads A, B and C comprise equal priority contexts (e.g. set to 'normal'), if during execution of a current thread A, a request is received corresponding to thread B followed by yet another request corresponding to thread C the following scheduling may apply:

if requests corresponding to threads B and C had not previously been received then the thread scheduler 230 may arbitrarily select B or C to be serviced after thread A completes, else:

if thread B had previously been scheduled and executed before A, and after a previous execution of thread C, then thread scheduler 230 may schedule thread C to be serviced after thread A completes, else:

if thread C had previously been scheduled and executed before A, and after a previous execution of thread B, then thread scheduler 230 may schedule thread B to be serviced after thread A completes.

Upon return from the scheduled thread, at 450, the method loops back to 430. Whilst all of the threads 225 comprise a priority context set to a 'normal' priority, the method cycles through the above steps, thereby enabling the execution of threads for processing received requests in, for example, a generally 'round robin' manner.

However, if at 430 it is determined that one or more threads 225 for which a request is pending comprise a priority context set to a higher priority, the method moves on to 470 where the higher priority thread 225 for which a request is pending is scheduled for execution. Upon return from the scheduled thread, at 450, the method loops back to 430.

Thus, in this manner, the controller unit 220 of FIG. 2 may be arranged to schedule higher priority threads for which a request requires processing ahead of lower priority threads. In accordance with some examples, the controller unit 220 may be arranged to pre-emptively set a priority context for a thread 225 for processing a forthcoming request. For example, a thread 225 executing within the controller unit 220 may be arranged to pre-emptively set its priority context to a higher priority for the processing of a forthcoming request.

As previously mentioned, jitter control is an important aspect for cut-through forwarding modules. In particular, jitter may be reduced by accelerating the processing and forwarding of the start of a data frame. Accordingly, by accelerating the processing of requests corresponding to the first data block of a data frame from a receiver component 210, the subsequent retransmission (forwarding) of that first data block may be accelerated.

Figure 5:
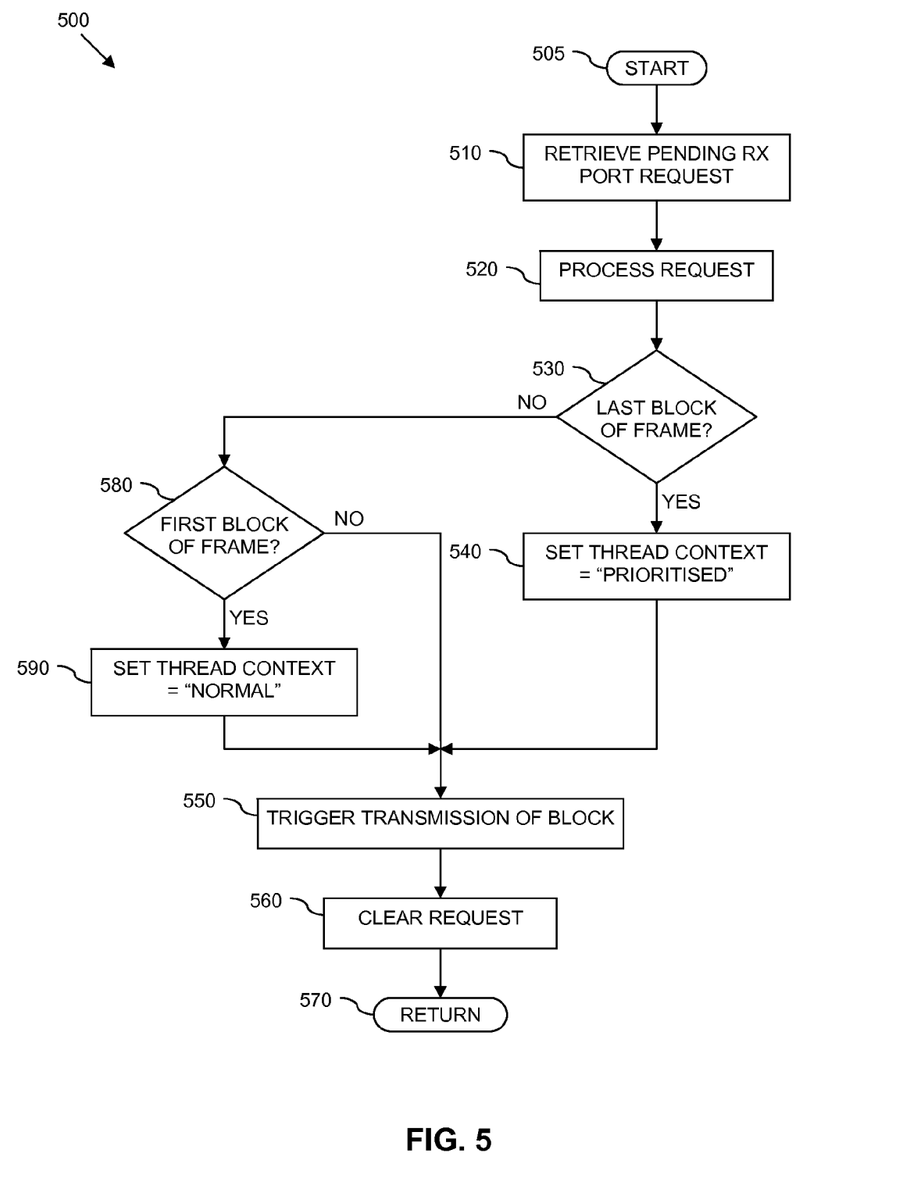

FIG. 5 illustrates a simplified flowchart 500 of an example of a method of pre-emptively setting a priority context within a thread 225, for example as executed within the controller unit 220. The method starts at 505, for example with the scheduling of the thread 225 that is to be executed for processing requests from a receiver component 210. The method then moves on to 510 with the retrieval (by the thread) of a pending request, for example from the request queue 245, which is to be processed by the thread 225. The thread 225 then processes the retrieved request at 520. Having processed the request, the thread 225 then determines whether (or not) the request relates to the last data block of a frame of data, at 530. If the request does relate to the last data block of a frame of data, the method moves on to 540 where the thread 225 sets its priority context to a higher priority, e.g. to 'prioritised'. The method then moves on to 550, where the thread 225 triggers the transmission of the data block for which the retrieved request was processed at 520, before clearing the processed request (e.g. from the request queue 240) at 560. The method then returns (i.e. hands back control of the hardware processor to the thread scheduler 230) at 570. In this manner, upon receipt of the next request for that thread (which will relate to the first data block for the next data frame), the scheduling of that thread will be prioritised ahead of other lower-priority threads.

Referring back to 530, if the processed request does not relate to the last data block of a frame of data, the method moves on to 580, where the thread 225 determines whether (or not) the request relates to the first data block of a frame of data. If the request does relate to the first data block of a frame of data, the method moves on to 590 where the thread 225 sets its priority context to a lower priority, e.g. 'normal'. The method then moves on to 550, where the thread 225 triggers the transmission of the data block for which the retrieved request was processed at 520, before clearing the processed request at 560, and returning at 570. In this manner, having been prioritised in order to accelerate the processing of the first block of data for the data frame, the thread 225 resets its priority context to 'normal'. Referring back to 580, if the processed request does not relate to the first block of a frame of data, the method moves straight to 550 without changing its priority context.

Thus, it is contemplated that a thread 225 executing within the controller unit 220 may be arranged to set its priority context to a higher priority upon processing within that thread 225 a request from the respective receiver component 210 for a last data block of a data frame. In this manner, since it can be assumed that the next data block received thereby will be the first data block of the next frame of data, by pre-emptively setting the priority context to a higher priority during processing of the last block of a data frame, the processing of the first block of the next data frame may be accelerated, thereby reducing jitter between the two frames. The thread 225 may subsequently, upon processing a request from the respective receiver component 210 for a first data block of a (subsequent) data frame, reset its priority context back to a lower priority.

In addition to 'inter-frame' pre-emptive setting of priority contexts in order to reduce jitter (such as described above in with reference to FIG. 5), 'intra-frame' pre-emptive setting of priority contexts may be implemented. For example, for controller units 220 running a large number of threads 225, or for controller units 220 comprising limited (e.g. slower) processing resources, threads responsible for processing requests generated by receiver components 210 may be arranged to be prioritised after, say, N blocks within a data frame, or every $N^{th}$ block within a data frame, in order to help ensure that requests generated by the receiver components 210 are processed by the controller unit 220 promptly enough to avoid under-run.

In some examples, intra-frame pre-emption may be used to enable a prompt triggering of inputs/outputs (I/Os) of a slave device, such as slave device 120, comprising a cut-through forwarding module 200. In some examples, signals or flags may be generated deterministically, for example based on the needs of the cut through mode. For example, I/O triggers of such slave devices 120 are often implemented in many industrial applications to control industrial machinery. The transport of commands, such as I/O triggers, from a master device 110, 115 to a slave device 120 is typically decoupled from the application of the slave device 120. For example, the master device 110, 115 may place a command inside a data packet, for example instructing the slave device to perform a function such as to switch a machine on or to decelerate or accelerate a motor, etc. The more control over how and when such a command is transported and executed, the more efficient and accurate such functions may be implemented. An I/O trigger may constitute an interrupt to an application of the slave device 120, or a line that toggles from 'low' to 'high' to enable some functionality in, say, a field programmable gate array (FPGA) that is connected to a processor (not shown) of the slave device 120. Alternatively, more than one I/O line may be updated in a command, for example an 8-bit input into a Digital to Analogue converter used to control, say, a speed of a motor.

In some examples for real-time applications, the synchronization of an application of a slave device 120 to the needs of the master device 110, 115 may be made dependent on the ability to provide deterministic transportation of I/O triggers and the like. By being able to prioritise a thread of the cut-through forwarding module 200 that is responsible for processing the received blocks of data for a data packet comprising such I/O triggers, signals, flags, etc., the processing of such blocks of data, and thus the transportation of such commands, may provide greater control over the latency and jitter of such commands. As a result, the transport of such commands may be deterministically achieved with finer granularity, more control and increased accuracy.

Figure 6:
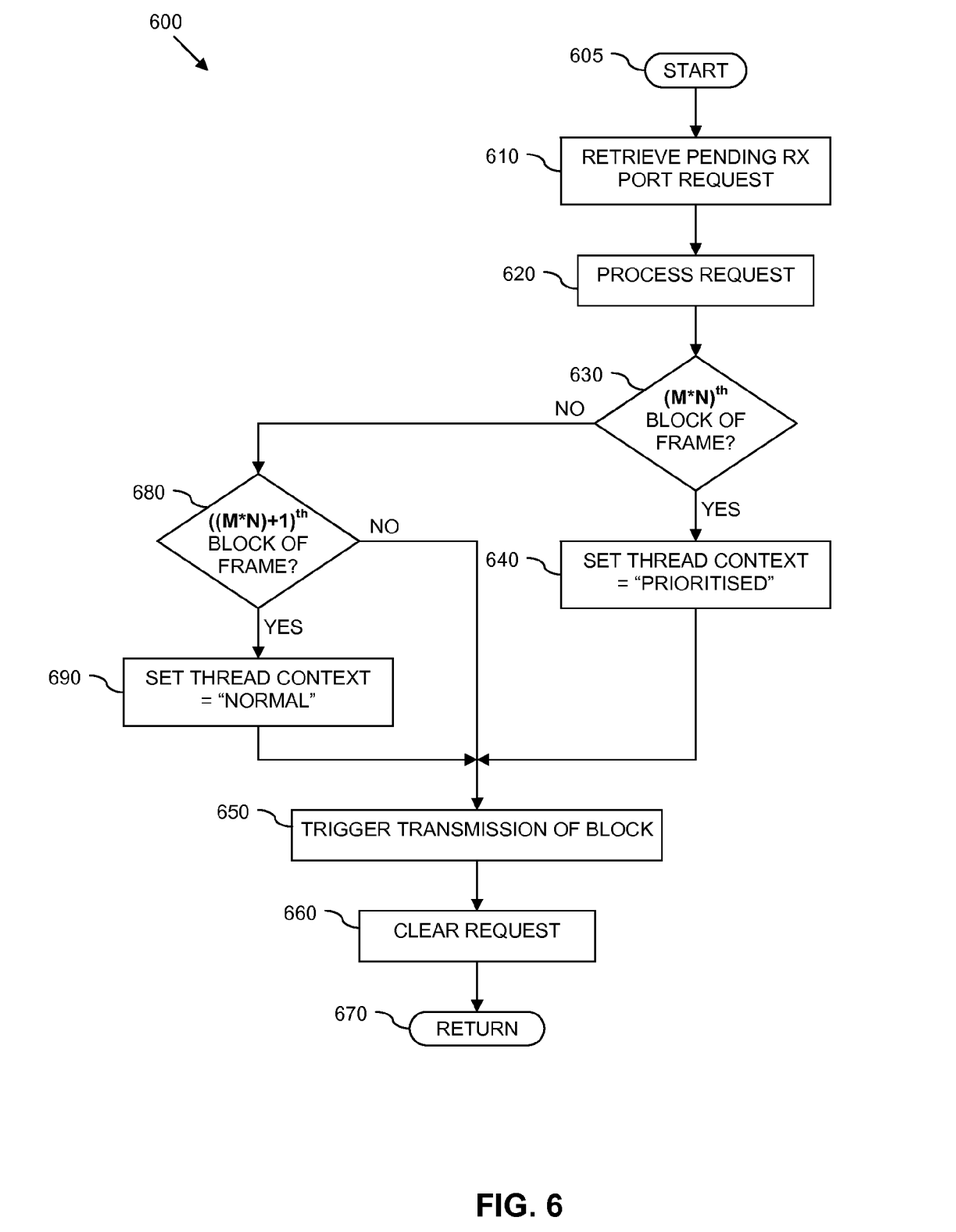

For example, FIG. 6 illustrates a simplified flowchart 600 of an example of an alternative method of pre-emptively setting a priority context within a thread 225, for example as executed within the controller unit 220 of FIG. 2. The method starts at 605, for example with the scheduling of the thread 225 that is to be executed for processing requests from a receiver component 210. The method then moves on to 610 with the retrieval (by the thread) of a pending request, for example from the request queue 245, which is to be processed by the thread 225. The thread 225 then processes the retrieved request at 620. Having processed the request, the thread 225 then determines whether (or not) the request relates to the $(M*N)^{th}$ data block of a frame of data, at 530, where N comprises a predefined number of data blocks received for that data frame, and M comprises an integer value. If the request does relate to the $(M*N)^{th}$ data block of a frame of data, the method moves on to 640 where the thread 225 sets its priority context to a higher priority, e.g. to 'prioritised'. The method then moves on to 650, where the thread 225 triggers the transmission of the data block for which the retrieved request was processed at 620, before clearing the processed request (e.g. from the request queue 240) at 660. The method then returns (i.e. hands back control of the hardware processor to the thread scheduler 230) at 670. In this manner, upon receipt of the next request for that thread (which will relate to the $(M*N)^{th}+1$ data block within the data frame), the scheduling of that thread will be prioritised ahead of other lower-priority threads.

Referring back to 630, if the processed request does not relate to the $(M*N)^{th}$ data block of a frame of data, the method moves on to 680, where the thread 225 determines whether (or not) the request relates to the $(M*N)^{th}+1$ data block of a frame of data. If the request does relate to the $(M*N)^{th}+1$ data block of a frame of data, the method moves on to 690, where the thread 225 sets its priority context to a lower priority, e.g. 'normal'. The method then moves on to 650, where the thread 225 triggers the transmission of the data block for which the retrieved request was processed at 620, before clearing the processed request at 660, and returning at 670. In this manner, having been prioritised in order to accelerate the processing of the $(M*N)^{th}+1$ data block for the data frame, the thread 225 resets its priority context to 'normal'. Referring back to 680, if the processed request does not relate to the $(M*N)^{th}+1$ block of a frame of data, the method moves straight to 650 without changing its priority context.

Thus, a thread 225 executing within the controller unit 220 of FIG. 2 may be arranged to set its priority context to a higher priority upon processing within that thread 225 a request from the respective receiver component 210 for the, or every $N^{th}$ block within a data frame of a data frame or for a plurality of arbitrarily spaced blocks within a data frame. In accordance with some examples, N may comprise a configurable parameter. In this manner, the intra-frame prioritisation of a thread may be configured in accordance with, say, one or more of the following: the cut-through processing mode to be supported by the cut-through forwarding module 200 and/or the latency/jitter requirements therefor, the block size B for which the respective receiver component 210 is configured, the number of threads supported by the controller unit 220, the processing abilities (e.g. processing speed/frequency) of the hardware processor(s) (not shown) on which the thread is executed, etc. Thus, by enabling the configuration of the parameter N in this manner, further control over the prioritisation, and thereby the latency/jitter of the forwarding of data and/or triggering of I/O, may be provided within the cut-through forwarding module 200 of FIG. 2.

In accordance with some examples, the controller unit 220 of FIG. 2 may be arranged to, after processing a request within a first, active, thread 225 for a predefined number X of processing cycles, determine whether (or not) one or more further, inactive, threads comprise(s) a priority context set to a higher priority, and suspend processing of the request 212 within the first, active, thread if it is determined that at least one further thread comprises a priority context set to a high priority. In this manner, if, say, the active thread is running a relatively long routine, e.g. a large number of commands required for processing the request, that thread may determine after a predefined number of processing cycles whether other threads have been prioritised, and are therefore in danger of under-run or causing too high jitter. Thus, the thread may enable the controller unit 220 to switch to the higher prioritised thread without having to wait for the active thread to complete its processing. In this manner, further control of latency and jitter may be provided within the cut-through forwarding module 200.

Figure 7:
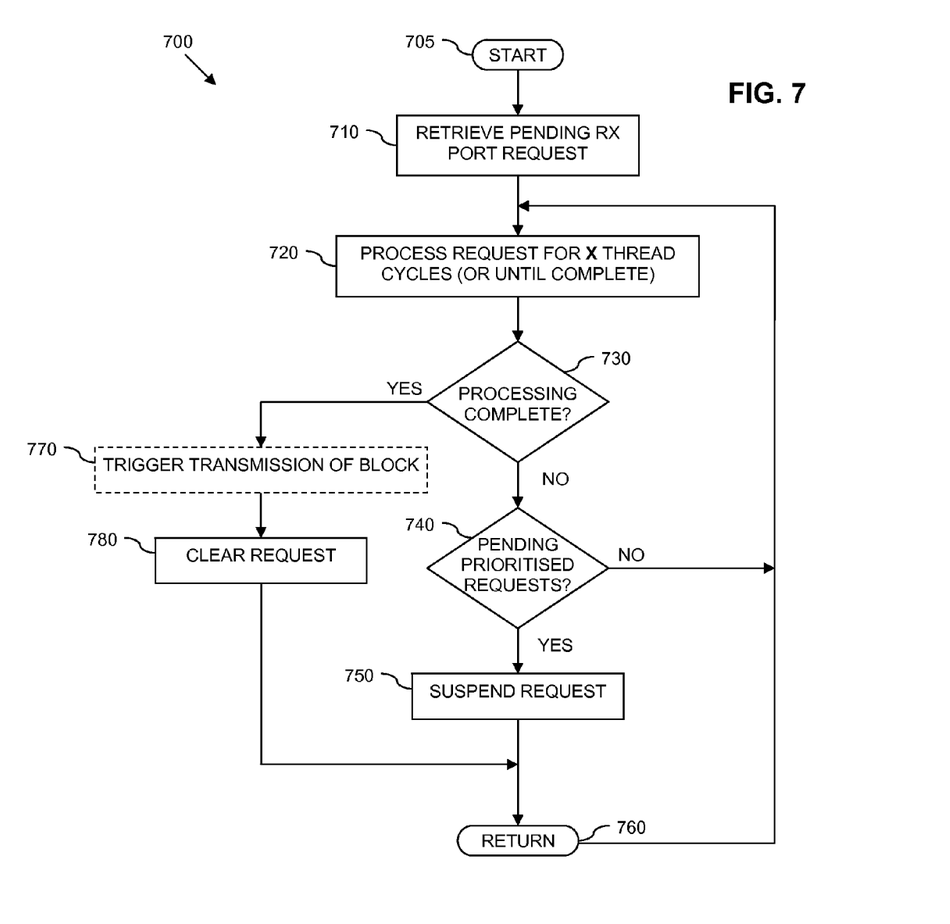

For example, FIG. 7 illustrates a simplified flowchart 700 of an example of a method of handling requests within a thread 225, for example as executed within the controller unit 220 of FIG. 2. The method starts at 705, for example with the scheduling of the thread 225 that is to be executed for processing requests. The method then moves on to 710 with retrieval (by the thread) of a pending request, for example from the request queue 245 of FIG. 2, which is to be processed by the thread 225. The thread 225 then processes the retrieved request for X processing cycles, at 720, or until processing is complete. If processing of the request is complete, at 730, the method moves on to 770 where, for example in a case of a request from a receiver component 210, the thread 225 triggers a transmission of the data block for which the retrieved request was processed at 720, before clearing the processed request (e.g. from the request queue 240) at 780. The method then returns (i.e. hands back control of the hardware processor to the thread scheduler 230) at 760.

However, if after processing the retrieved request for X processing cycles processing of the request is not complete, the method moves on to 740, where the thread determines whether (or not) one or more requests are pending for other threads having a priority context set to a higher priority (e.g. 'prioritised'). For example, for the example illustrated in FIG. 2, priority contexts for threads are stored within a look up table 235 and pending requests are stored within a request queue 245, which may be visible to threads being executed. In this manner, the priority context of one thread of the controller unit 220 is visible to other threads within the controller unit 220. In particular, all pending prioritized requests in 740 (for example pending requests relating to prioritized threads) may be visible to an active thread. Thus, an active thread is able to determine whether (or not) other (inactive) threads have a priority context set to a higher priority, and whether requests are pending for such threads. Thus, it may be possible for an active thread to see all pending prioritized requests, and for the active thread to cause a context switch to, for example, a prioritized thread with the first block of a frame, or a prioritized thread with a high priority intra-frame block, depending on the cut through mode requirements. If no other threads for which requests are pending in 740 have a priority context set to a higher priority, the method loops back to 720, where the thread continues to process the retrieved request for a further X processing cycles, or until processing is complete. If it is determined that another (inactive) thread does have a priority context set to a higher priority, and a request is pending therefor in 740, the method moves on to 750 where the request being processed is suspended, and the thread returns at 760. In this manner, the higher priority thread may be executed to process, for example, the jitter critical request. Once the higher priority thread has completed processing its request, the previous thread may again be scheduled (since its request would still be at the 'front' of the request queue 245) in order to complete the processing of the suspended request.

Thus, a thread 225 executing within the controller unit 220 may be arranged to, after processing a request within a first, active, thread 225 for a predefined number X of processing cycles, determine whether (or not) one or more further, inactive, threads comprise(s) a priority context set to a higher priority, and suspend(s) processing of the request 212 within the first, active, thread if it is determined that at least one further thread comprises a priority context set to a high priority. In accordance with some examples X may comprise a configurable parameter. In this manner, the frequency with which a thread checks to see if a higher priority thread exists may be configured in accordance with, say, one or more from a group consisting of: a cut-through processing mode to be supported by the cut-through forwarding module 200 and/or the triggering of I/O and/or latency/jitter requirements therefor, the block size B for which the respective receiver component 210 is configured, the number of threads supported by the controller unit 220, the processing abilities (e.g. processing speed/frequency) of the hardware processor(s) (not shown) on which the thread is executed, etc. Thus, by enabling the configuration of the parameter X in this manner, further control over the prioritisation, and thereby the latency/jitter of the forwarding of data and triggering of I/O, may be provided within the cut-through forwarding module 200. In an alternative example, checks such as performed in FIG. 7 at 730 to 740 may alternatively be encoded into long routines to be performed by a thread at convenient points as determined by the programmer thereof, as opposed to at regular intervals of X processing cycles in the example of FIG. 7.

For the examples hereinbefore described, the priority contexts for threads have been pre-emptively set within the threads themselves. However, in other examples, the priority context for a thread may be set by other elements within the cut-through forwarding module 200 of FIG. 2. For example, the request handler 240 within the controller unit 220 may be arranged to initialise a request timer 250 upon receipt of a request from a receiver component 210, and to set a priority context for a thread 225 that is responsible for processing that request to a higher priority if, say, that request has not been processed upon expiry of the request timer.

Figure 8:
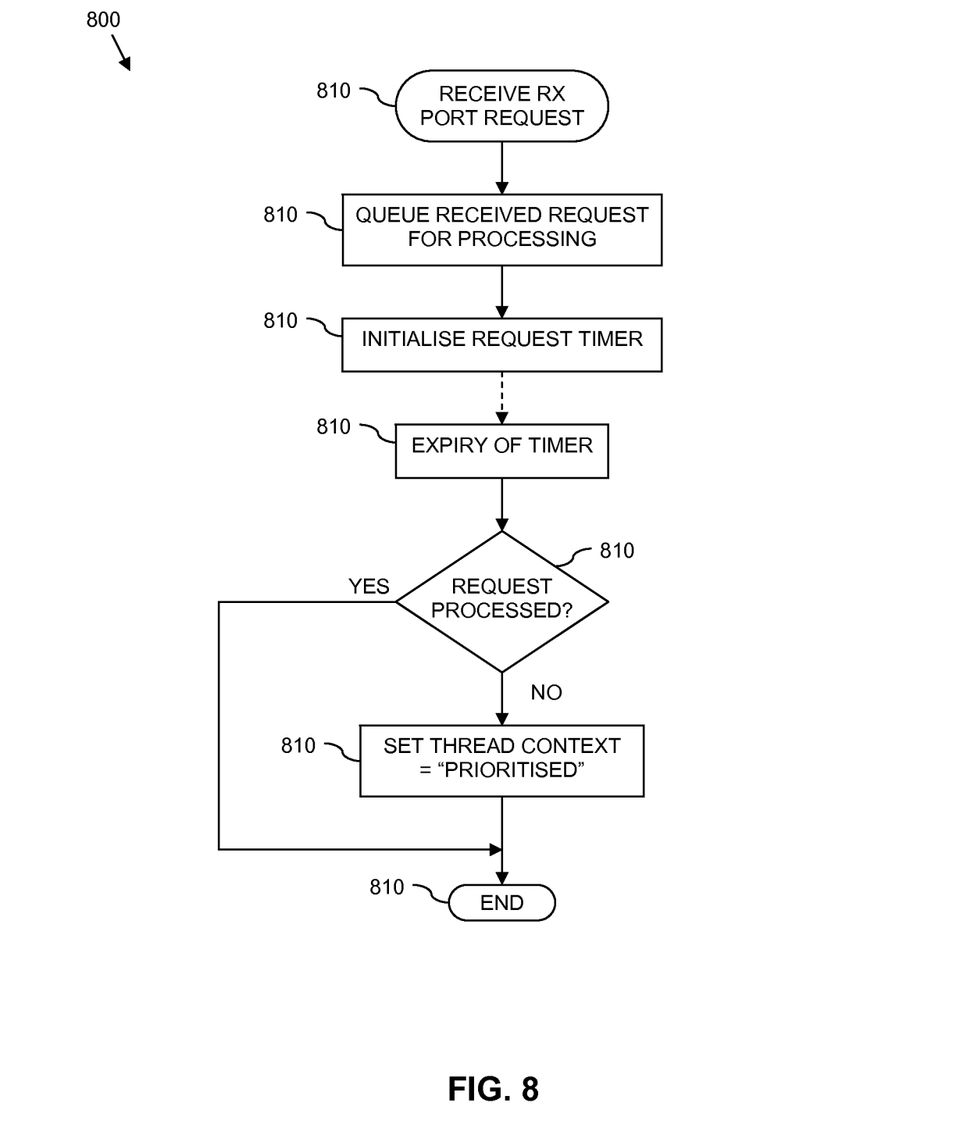

For example, FIG. 8 illustrates a simplified flowchart 800 of an example of handling a request from a receiver component, for example as may be implemented by the request handler 240 illustrated in FIG. 2. The method starts at 810 with a receipt of a request from a receiver component 210, and moves on to 820 where the received request is queued for processing, for example by being added to the request queue 245 of FIG. 2. A request timer, such as request timer 250 illustrated in FIG. 2, is then initialised, for example set to count up to or down from a predetermined value. Upon expiry of the timer, at 840, it is determined whether the request for which the timer was initiated has been processed. If the request has been processed, then the method ends at 870. However, if the request has not been processed, the method moves on to 860, where the priority context for the thread that is responsible for processing the request is set to a higher priority (e.g. to a 'prioritised' state), and the method then ends at 870.

In some examples, a timer, such as timer 250, may additionally be used to decouple the triggering of I/O operations, etc. from the normal block processing flow. For example, in some examples, a further thread that is not concerned with block processing may be used for this purpose, and the timer 250 may be set to count up to or count down from a specific value in order to cause the I/O to be triggered at a certain time. After the timer expires, the context priority for this thread may be set to a higher priority to deterministically trigger the I/O. This routine, if lengthy, may also take into account any processing of other threads, e.g. the first block of a frame. In this manner, if a command is received to trigger an I/O at some future point after (potentially well after) the frame containing the command has been received, then the timer 250 enables the thread that is responsible for the triggering of the I/O to be prioritised to enable the triggering of the I/O to be better controlled. For example, such a command may state something akin to 'toggle an I/O line in 5 sec time, or at 6 pm today, or in 20 bytes time'. When the timer 250 expires, the priority context for the respective thread may then be set to a higher priority, or the timer 250 can be used to mask the request from a thread until the timer 250 expires, upon which the respective thread is unmasked and is available for selection at a priority based on the requirements of the cut through mode and/or I/O triggering. In some examples, a plurality of timers may be available to support multiple threads.

Thus, in this manner, a thread within the controller unit 220 may be prioritised if a respective request has been masked or not been processed thereby within a predetermined time limit, thus, enabling the scheduling of that thread to process the request to be accelerated in order to meet latency/jitter and I/O triggering requirements. In some examples, the duration of the request timer 250 may be configurable. In this manner, a time limit for processing a request after which its respective thread will be prioritised may be configured in accordance with, say, one or more from a group consisting of: the cut-through processing mode to be supported by the cut-through forwarding module 200 and/or the latency/jitter requirements therefore, the block size B for which the respective receiver component 210 is configured, the number of threads supported by the controller unit 220, the processing abilities (e.g. processing speed/frequency) of the hardware processor(s) (not shown) on which the thread is executed, etc. Thus, by enabling the configuration of the duration of the request timer 250 in this manner, still further control over the prioritisation, and thereby the latency/jitter of the forwarding of data and/or triggering of I/O, may be provided within the cut-through forwarding module 200 of FIG. 2.

Thus, in some examples, a cut-through forwarding module, such as hereinbefore described with reference to the accompanying drawings, may allow the design of a device that may be substantially optimally configured, sized, powered and priced for the requirements of a plurality of cut through modes.

At least part of the invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, for ease of understanding, a single integral controller unit 220 has been illustrated in FIG. 2. However, it will be appreciated that the functionality of the controller unit may be distributed across a plurality of hardware and/or software components within the cut-through forwarding module 220

Furthermore, the thread scheduler 230 and request handler 240 have been illustrated for ease of understanding as discrete functional components within the controller unit 220. However it will be appreciated that the functionality of each of these components may equally be implemented, together or separately, across any number of discrete hardware and/or software components within the controller unit 220.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected', or 'operably coupled', to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as software or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an', as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an'. The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An integrated circuit device comprising:
   at least one cut-through forwarding module, the cut-through forwarding module comprising:
      at least one receiver component arranged to receive data to be forwarded, and to generate a request for transmission of a block of data upon receipt thereof; and
      at least one controller unit arranged to execute at least one thread for processing requests generated by the at least one receiver component, wherein the at least one controller unit is arranged set a priority context for the at least one thread, and to schedule an execution of the at least one thread based at least partly on the priority context therefore;
   wherein the cut-through forwarding module begins forwarding the block of data before a frame of data comprising the block of data has been received in its entirety by the cut-through forwarding module.

2. The integrated circuit device of claim 1 wherein the controller unit is further arranged to schedule higher priority threads for which a request requires processing ahead of lower priority threads.

3. The integrated circuit device of claim 1 wherein the controller unit is arranged to pre-emptively set the priority context for the at least one thread during execution of that thread.

4. The integrated circuit device of claim 3 wherein the controller unit is arranged to set the priority context for the at least one thread to a higher priority upon processing within that thread a request from the at least one receiver component for a last block of a data frame.

5. The integrated circuit device of claim 4 wherein the controller unit is further arranged to set a priority context for a thread to a lower priority upon processing within that thread a request from the at least one receiver component for a first block of a data frame.

6. The integrated circuit device of claim 3 wherein the controller unit is arranged to set a priority context for a thread to a higher priority upon processing within that thread a request from the at least one receiver component for an Nth block of a data frame, where N comprises a number of data blocks received for that data frame.

7. The integrated circuit device of claim 6 wherein the controller unit is arranged to set a priority context for a thread to a higher priority upon processing within that thread a request from the at least one receiver component for a (M*N)th block of a data frame, where M comprises an integer value.

8. The integrated circuit device of claim 6 wherein the controller unit is arranged to set a priority context for a thread to a lower priority upon processing within that thread a request from the at least one receiver component for a block of a data frame.

9. The integrated circuit device of claim 6 wherein N comprises a configurably predefined number of data blocks received for that data frame.

10. The integrated circuit device of claim 1 wherein the controller unit is further arranged to initialise a request timer upon receipt of a request from the at least one receiver component, and to set a priority context for a thread for that request to a higher priority if that request has not been processed upon expiry of the request timer.

11. The integrated circuit device of claim 10 wherein the duration of the request timer is configurable.

12. The integrated circuit device of claim 1 wherein the controller unit is further arranged to, after processing a request within a first thread for a predefined number X of processing cycles determine whether at least one further thread comprises a priority context set to a higher priority and suspend processing of the request within the first thread if it is determined that at least one further thread comprises a priority context set to a high priority.

13. The integrated circuit device of claim 12 wherein X comprises a configurably predefined number of processing cycles.

14. The integrated circuit device of claim 1 wherein the priority context of one thread of the controller unit is visible to other threads within the controller unit 220.

15. The integrated circuit device of claim 1 wherein the at least one receiver component is arranged to generate a request for transmission of a block of data upon receiving a block of B bytes of data; wherein the size B of a block of data is configurable.

16. The integrated circuit device of claim 15 wherein the controller unit is further arranged to configure the size B of a block of data upon receipt of which the at least one receiver component is to generate a request for transmission thereof.

17. A method for performing cut-through forwarding of packet data, the method comprising:
   receiving at least one request for transmission of a block of data from a receiver component; and
   executing at least one thread for processing the at least one request received from the at least one receiver component;
   wherein the method further comprises:
   setting a priority context for the at least one thread, and
   scheduling an execution of the at least one thread based at least partly on the priority context therefore;
   wherein forwarding of the block of data begins before a packet of data comprising the block of data has been received in its entirety.

18. The method of claim 17 wherein the method further comprises scheduling an execution of higher priority threads for which a request requires processing ahead of lower priority threads.

19. The method of claim 18 wherein the method comprises pre-emptively setting a priority context for a thread during execution of that thread.

20. The method of claim 17 wherein the method further comprises:
   initialising a request timer upon receipt of a request from the at least one receiver component, and
   setting a priority context for a thread for that request to a higher priority if that request has not been processed upon expiry of the request timer.

* * * * *